United States Patent [19]

Engert et al.

[11] 4,402,349

[45] Sep. 6, 1983

[54] PROCESS AND APPARATUS FOR CHARGING TUBULAR REACTORS WITH GRANULAR SOLIDS, MORE PARTICULARLY CATALYSTS

[75] Inventors: Gerd-Juergen Engert, Ludwigshafen; Klaus de Haas, Worms; Rudolf Magin, Schifferstadt; Franz Nenninger, Heidelberg; Horst Schauer, Mutterstadt, all of Fed. Rep. of Germany

[73] Assignee: BASF Aktiengesellschaft, Ludwigshafen, Fed. Rep. of Germany

[21] Appl. No.: 320,450

[22] Filed: Nov. 12, 1981

Related U.S. Application Data

[63] Continuation of Ser. No. 90,590, Nov. 2, 1979, abandoned.

[30] Foreign Application Priority Data

Nov. 16, 1978 [DE] Fed. Rep. of Germany ....... 2849664

[51] Int. Cl.³ ............................................... B65B 1/04
[52] U.S. Cl. ........................................ 141/9; 141/248; 141/284; 177/70; 177/93; 222/77; 366/18; 366/141; 366/152
[58] Field of Search ..................... 141/1, 9, 11, 12, 83, 141/105, 106, 107, 248, 284, 392, 100, 104; 177/70, 93; 222/55, 56, 57, 77; 366/18, 141, 151, 152

[56] References Cited

U.S. PATENT DOCUMENTS

| 3,448,967 | 6/1969 | Seanor et al. | 366/18 |
| 3,685,602 | 8/1972 | Mayer | 177/70 |
| 3,878,774 | 4/1975 | Frossard | 141/248 |
| 3,985,266 | 10/1976 | Wright | 222/77 |
| 4,068,692 | 1/1978 | Arya | 141/392 |

FOREIGN PATENT DOCUMENTS

| 1266526 | 11/1968 | Fed. Rep. of Germany . |
| 2056614 | 11/1970 | Fed. Rep. of Germany . |
| 2641591 | 3/1978 | Fed. Rep. of Germany . |

Primary Examiner—Houston S. Bell, Jr.
Attorney, Agent, or Firm—Keil & Witherspoon

[57] ABSTRACT

A mechanical process for filling the tubes (3) of tubular reactors with granular solids, e.g. catalysts, wherein two or more streams of material, e.g. of different catalytic activity, can be introduced in a controlled manner into each tube (3) which is to be filled, from two or more stock vessels (1,2) via two or more dispensing devices (MI, MZ) mounted above the upper tube end plate (13). By this process, different thermal/catalytic reaction profiles can be achieved over the length of the tube, or in certain groups of tubes within the tubular reactor, with substantially less time being required for filling the tubes (3).

6 Claims, 1 Drawing Figure

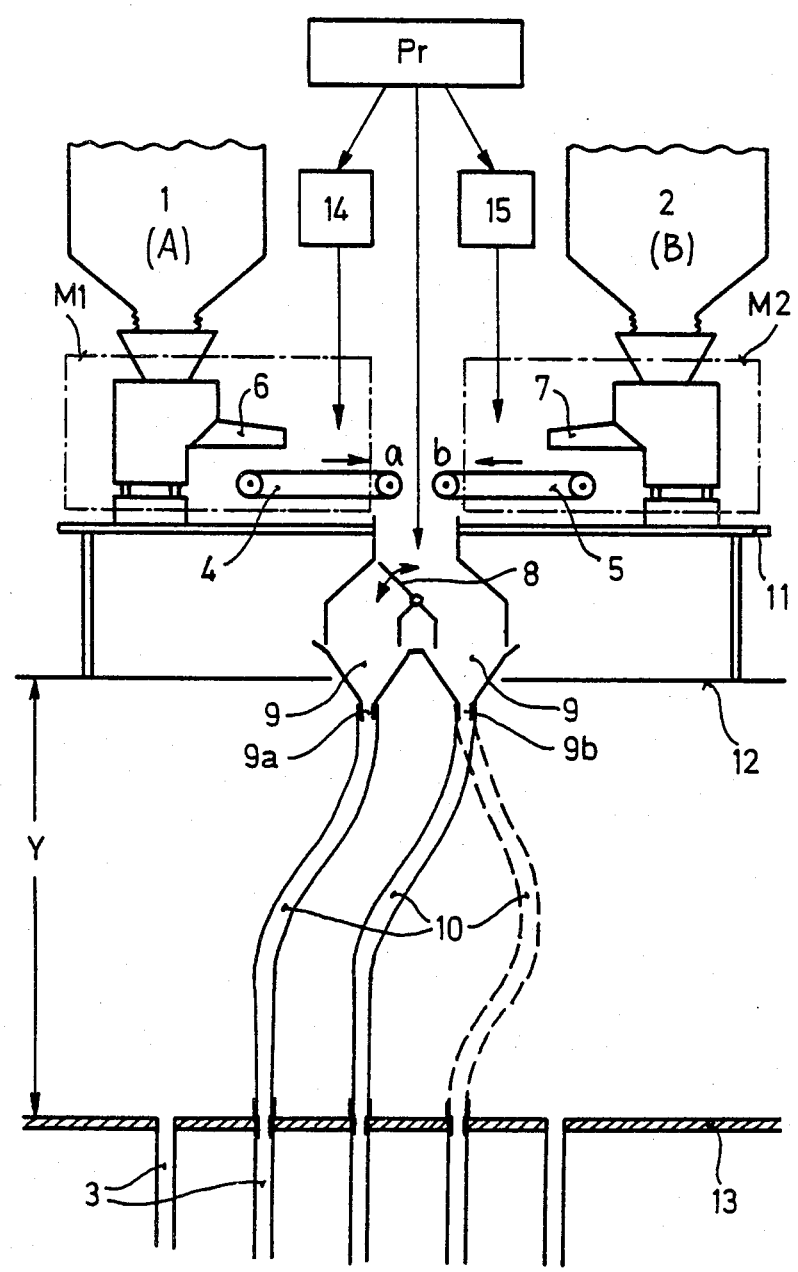

PROCESS AND APPARATUS FOR CHARGING TUBULAR REACTORS WITH GRANULAR SOLIDS, MORE PARTICULARLY CATALYSTS

This is a continuation, of application Ser. No. 090,590, filed Nov. 2, 1979, now abandoned.

The present invention relates to a process for rapidly charging a plurality of tubes in a tubular reactor with granular solids, preferably with catalysts, and more particularly with at least two types of solids, each having a different activity, composition and/or nature, and to an arrangement of stock vessels, measuring devices and conveying devices for carrying out this process.

The selective oxidation of hydrocarbons over fixed beds of a pourable catalyst is employed extensively. Such reactions as, for example, the production of maleic anhydride from butenes or butanes, of phthalic anhydride from o-xylene, of ethylene oxide from ethylene and of acrylic acid from propylene are highly exothermic. To carry out these processes industrially, tube bundle reactors with up to 40,000 individual tubes are employed. The heat generated is removed by means of a coolant circuit, with the coolant flowing over the outside of the tubes.

For a number of years, extensive investigations have been in progress on the time-consuming process of charging such industrial reactors with catalysts. Manual filling requires a great deal of time, since the individual tubes must be filled uniformly and reproducibly as regards the total amount and bulk density of the catalyst. Previous endeavors to substantially mechanize this filling process have not given the expected results. Catalyst beds or tubular reactor packings exhibiting an activity which is constant over the axial dimension of the reactor are in general produced as follows:

The amount of catalyst required per tube is weighed out individually and introduced into the tube by means of a funnel. If the catalyst is poured in slowly and carefully, blockages in the funnel and in the tube can largely be avoided. The operating time required for filling a tube is about 120 seconds, judging from experience gained on a pilot unit, namely 40 seconds work by three men. The rate-determining factor is the positioning of the funnel and the pouring out of the free-flowing catalyst. The weighing out, dividing into portions and transportation of the catalyst, its handingover and the covering of the filled tubes take place at the same time. If the work is carried out carefully, a correction of the measured pressure drops in the filled tubes is, as a rule, rarely necessary. From this time estimate, filling a reactor comprising, for example, 22,000 tubes requires 735 man-hours. Since the working space available above the tube end plate of the reactor is limited and does not allow large numbers of people to work there simultaneously, the time required for filling a reactor cannot be reduced at will.

On the other hand, German Published Application DAS No. 2,056,614 (U.S. Pat. No. 3,801,634) discloses a two-stage process for the preparation of acrylic acid by oxidizing propylene in the gas phase, in which the activity of the catalyst is varied, in both stages, in such a way that it rises to 100% in the flow direction and the reaction off-gases which are obtained from the second reaction stage and have been substantially freed from condensable gases are in part recycled to the first stage. In this process, the dilution is so arranged that the activity rises, progressively or stepwise, to 100% from the reaction tube inlet to the outlet. Advantageously, however, the system is arranged so that 100% activity is reached before the end of the reaction tube. As a general rule, catalyst beds of such varying activity can be most simply produced by mixing a homogeneous catalyst of uniform activity either with another catalyst of a different activity or with an inert material of similar particle size. The advantages of such varying catalyst beds are known from laboratory investigations; however, their industrial exploitation has hitherto not been feasible. The difficulties mentioned above, which even occur when filling tubes with a homogeneous catalyst of uniform activity, have hitherto made it impossible to charge a reactor so as to produce a progressively variable activity profile. Occasionally, discontinuously diluted catalyst beds have been employed in industry. For this purpose, from 3 to 15 lots, each containing different proportions of inert material, were arranged in layers one above the other. The lots were weighed out, mixed, and then filled into the reaction tubes through a funnel. However, this method of filling has substantial disadvantages:

(a) Filling an industrial reactor is extremely timeconsuming and therefore in most cases not feasible.
(b) There are excessive differences between the pressure drops in the individual tubes.
(c) Mixing the catalyst with the inert material entails an additional process step.
(d) Mixing the catalyst with the inert material causes abrasion which in turn produces an undesirably high pressure drop in the filled tube.
(e) The activity profile produced is only quasi-progressive.

It is an object of the present invention to provide a mechanical process, which can be regulated, for charging the tubes of tubular reactors more rapidly with granular solids, by means of which process it is possible to obtain, in accordance with predetermined programs, either constant or varying activity profiles, the variation, in the latter case, being either over the length of the tube or in certain groups of tubes of the complete tube bundle, and to provide an arrangement for carrying out the process wherein the varying dispensing of the different packings to be taken from stock vessels is not effected volumetrically, as hitherto, but, preferably, by gravimetric dispensing which varies with time.

We have found that this object is achieved, according to the present invention, if a homogeneous stream of material is continuously removed from each of two or more stock vessels and each stream is fed to a measuring device which dispenses the separate streams of material, each via a regulator, at rates varying with time in accordance with predetermined parameters, and if then the streams of material which have been dispensed continuously and in differing amounts are brought together and introduced, by means of mechanically controlled guide devices, into the tubes to be filled.

An arrangement for carrying out this process comprises, according to the invention, an intermediate plate, removably mounted at a distance above the upper tube end plate of the reactor, on which intermediate plate is fixed centrally a funnel-like guide device with at least two outlets and a shunt which opens or closes these outlets, the orifices of the reactor tubes being successively connectable to the guide device by means of flexible hoses connected to the outlets, and which further comprises, fixed above the centrally arranged guide device, two or more measuring devices, preferably conveyor-type metering weighers, which are continuously fed from corresponding stock vessels and which continuously discharge streams of material, the streams being varied with time by corresponding regulators in accordance with predetermined programs, into the guide device to below the weighers. Possible measuring devices, to be used for two or more streams of material, which can be varied with time are not only conveyor-type metering weighers but also other metering devices, for example screw-type metering weighers, differential metering weighers or pourer-type measuring devices, provided these conform to the essential pre-condition that their set point can be varied rapidly as a function of time.

The invention makes it possible to produce, in an economical manner, by mixing materials of different activity, for example catalysts A and B, in a particular tube, or in a particular group of tubes of the bundle, packings whose activity depends on the ratio in which the materials are mixed. In view of this basic relationship, the most important feature of the invention is that two mass streams y and b, with or without further mass streams c . . . n, are varied rapidly with time, by means of measuring and control equipment, before being brought together and mixed.

The individual mass streams, a, b . . . n are related to the corresponding volume streams by the respective bulk densities, which in practice can be assumed to be approximately constant. For the case of a vertical reaction tube to be filled, the following can be demonstrated mathematically:

If the local activity function a (x) at a particular axial height of the reaction tube is defined as the ratio of the volumetric proportion of catalyst A to the combined volumetric proportions of catalyst A + catalyst B, and this local function is expressed in mathematical terms, there is a clear mathematical relationship between the activity function a (x) and the mass streams $m_A$ and $m_B$ (or the corresponding volume streams $v_A$, $v_B$) to be metered in at a given time. The equations which link these parameters are soluble partial differential equations containing the variables x and t. This means that the mass streams $m_A$ (t) and $m_B$ (t) can be determined as functions of time if a (x) and the local geometry are known. This clear mathematical relationship also applies if more than two components A and B are metered in. The activity function a (x) can be taken as any desired function of the position in the tube.

Transforming these theoretical considerations into industrially useful apparatus for mechanically filling the reaction tubes requires a very accurate measuring or metering device to produce the mass streams which can be varied with time. Furthermore, the filling apparatus, and its guide device and distributing device, must be such that a plurality of tubes can be filled very rapidly and at industrially acceptable cost. In principle, both volumetric and gravimetric systems can be used as controllable measuring or metering devices for carrying out the process according to the invention. However, in the development work which has resulted in the invention, rapidly adjustable gravimetric measuring devices have proved superior.

The invention will now be described, by way of example, with reference to the accompanying drawings, the sole FIGURE of which diagrammatically shows an arrangement according to the invention for charging a plurality of tubes in a tubular reactor with granular solids.

For reasons of simplicity, the arrangement depicted is confined to the time-variable metering and mixing of two material streams a and b. However, more than two stock vessels and a corresponding number of dispensing devices $M_1$, $M_2$, the setting of which can rapidly be varied with time, can be grouped together to form one functional unit, which then feeds, for example, three or four streams of material into a mixing and filling system.

The free-flowing, preferably granular solids A and B, which are to be introduced as a mixture into the reaction tubes 3, are introduced, from the stock vessels 1 and 2, respectively into the dispensing devices $M_1$ and $M_2$ located under the stock vessels. Each dispensing device comprises a conventional vibrating chute 6, 7 to maintain very constant streams of materials a, b up to when the material is transported onto corresponding weighing devices 4 and 5. The weighing devices employed are preferably conveyor-type metering weighers, the general constructional features of which are described, for example, in German Pat. No. 1,266,526. For the present applications, it is merely necessary to adjust such weighers to be capable of accepting a time-dependent program control, with a rapidly variable set point, and in particular to shorten their response times. The vibrating chutes 6 and 7, together with the conveyor belts of the weighers 4 and 5, ensure that the material, preferably catalysts, to be introduced into the tubes is handled gently, with little abrasion.

The desired mass flows of the streams of materials a and b are communicated, as the set point, to the weighing devices 4 and 5. After the conveying rate has settled down, the total amount to be filled into each individual reaction tube 3 is present by means of a timer on a program control Pr. An electrical output signal from the timer then controls a shunt 8 in the upper region of a funnel-like discharge vessel 9 in such a way that either the outlet nozzle 9a or 9b is connected with the material streams a and b delivered by the weighing devices 4 and 5. Where there are merely two outlet nozzles 9a, 9b, the shunt 8 is advantageously constructed as a flap, the upper edge of which rests tightly against the inlet nozzle, which is for example rectangular, of the funnel-shaped collecting device 9. The shunt 8 is switched over in accordance with a pre-selected time cycle. Flexible, preferably transparent, hoses 10 are fixed to the discharge funnels 9a, 9b, and are attached to the individual tubes 3. The length of the hoses 10 is such to allow filling a very large tube bundle. The maximum radius over which the device can be employed is determined by the flow characteristics of the catalyst within the hoses 10 and by the vertical distance Y between an intermediate plate 12 supporting the discharge vessel 9 and the tube end plate 13, and can advantageously be determined by experimentation. In other respects, the funnel-shaped collecting device 9 and the hoses 10 act like a static mixing zone. To improve mixing, it is possible to insert baffles, such as are conventionally used in static mixers, into the hoses 10. The entire filling device, comprising two or more stock vessels 1, 2 and a corresponding number of dispensing devices $M_1$, $M_2$, is advantageously mounted on a baseplate 11 which possesses a central hole into which is inserted the upper inlet nozzle of the funnel-shaped device 9 complete with its lower outlets. The entire arrangement, including the funnel-shaped collecting device 9, can then be additionally mounted on the intermediate plate 12, the distance Y of which plate from the inlet orifices of the reaction tubes, on the upper tube end plate 13, being also determined by the external dimensions of the reactor.

The apparatus for metering two components, shown diagrammatically in the FIGURE, can readily be modified for metering a larger number of components. In that case, the stock vessels 1, 2 . . . x, and the dispensing devices $M_1$, $M_2$ . . . $M_x$ located below them are arranged, for example, radially, over the baseplate 11 and the funnel-shaped collecting device 9 comprises, as the shunt 8, a rotating element, such as is conventionally used, for example, in lock devices. Furthermore, the shunt 8 can be brought into communication with more than two outlets, with a cyclic switch-over between these, in accordance with a predetermined program. The device described above further offers the advantage that extraction devices for removing fines abraded from the conveyed solid can be attached to the flexible hoses 10, to the shunt 8 or to the weighing devices 4 and 5. For catalysts, in particular, dust extraction is important in order to prevent additional pressure drop in the reaction tubes 3. It is furthermore possible to provide the bottoms of the vibrating chutes 6 and 7 with slots so that even before the streams of material a and b reach the conveyor belts of the dispensing devices $M_1$, $M_2$, the dust has been sieved out. In general, the change-over of the filling hoses 10 can be carried out sufficiently rapidly by manual means. However, mechanization of the change-over of the hoses 10 is also possible and, where appropriate, a co-ordinate-controlled change-over device—which itself lies outside the scope of the present invention—may be employed for this purpose.

In order to change the tubes of a tubular reactor with two or more types of granular solids of different activity, composition and/or nature, in the form of a program-controlled mixture, the time-variable material streams a, b . . . n are employed (taking due account of the different bulk densities of the individual materials) as set-points of regulators 14 and 15 of the dispensing devices $M_1$ and $M_2$. After each individual tube has been filled, the shunt 8 is used to switch over to the other outlet nozzle 9a or 9b, and the process of filling the next tube starts immediately. The shunt 8 is also controlled automatically in accordance with the pre-selected program. If the change-over of the hoses 10 is carried out manually, the control of the shunt 8 may, for example, be coupled to an acoustic or optical signal, which indicates to the operator that the particular hose 10 requires to be changed over to another tube. In this way, the process of filling a reactor becomes quasi-continuous.

The time required for filling a tubular reactor with two or more types of granular solids, preferably with catalysts, by the process according to the invention is only slightly greater than that required for filling the same reactor with only one homogeneous material having the same flow properties. A particular application of the invention is for filling a tubular reactor comprising many thousands of individual tubes, which reactor is to be run with certain temperature profiles over the length of the tube or for certain groups of tubes within the entire tube bundle. In such cases the stream of material b to be taken from stock vessel 2 is, for example, a diluent for the stream of material a to be taken from stock vessel 1.

We claim:

1. A process for charging the tubes of a tubular reactor with granular solids contained in a plurality of stock vessels in such a way that the activity of the granular solids varies progressively from the reaction tube inlet to the reaction tube outlet, comprising continuously removing homogeneous streams of material of different activity, composition and/or nature from respective ones of said stock vessels, feeding the streams from said plurality of stock vessels concurrently to respective measuring devices individually associated with said streams, each of said measuring devices being in the form of a conveyor-type metering device of the kind which itself is equipped to weigh the material dispensed by the conveyor, dispensing the streams of material from the respectively associated metering devices under the control of a regulator, associated with each metering device, concurrently and at respective rates varying with time in accordance with predetermined parameters, combining the different streams of material which have been dispensed continuously and in differing amounts and introducing the combined streams of material, by means of mechanically controllable guide devices, selectively into the tubes to be charged.

2. A process as claimed in claim 1, in which at least one of the granular solids is a catalyst.

3. A process as claimed in claim 1, in which the said combined material streams are passed through a mixing zone before being introduced into said at least one tube to be charged.

4. A process as claimed in claim 1, in which one of said streams of material is an inert diluent for one or more other of said homogeneous streams of material.

5. An arrangement for charging the tubes of a tubular reactor with granular solids contained in stock vessels in such a way that the activity of the granular solids varies progressively from the reaction tube inlet to the reaction tube outlet, which comprises:

an intermediate plate mounted at a distance above the upper tube end plate of the reactor, a funnel-like guide device fixed centrally on said intermediate plate and having an inlet, at least two outlets and a shunting device for opening or closing said outlets, means, including flexible hoses, for connecting said outlets successively to the orifices of the reactor tubes, a plurality of measuring devices fixed above the centrally arranged guide device, each of said measuring devices being in the form of a conveyor-type metering device of the kind which itself is equipped to weigh the material dispensed by the conveyor, means including a corresponding plurality of said stock vessels for continuously and concurrently feeding homogeneous streams of material of different activity, composition and/or nature to the respective metering devices, means including a plurality of regulators respectively associated with the different metering devices, for controlling the concurrent discharging of material from said metering devices into the inlet of said guide device, and programmable control means for controlling the operation of said regulators.

6. An arrangement as claimed in claim 5, in which the programmable control means also controls the operation of said shunting device.

* * * * *